US011687335B2

(12) United States Patent
Ignatyev et al.

(10) Patent No.: US 11,687,335 B2
(45) Date of Patent: Jun. 27, 2023

(54) SOFTWARE DEFECT PREDICTION MODEL

(71) Applicant: Oracle International Corporation, Redwood Shores, CA (US)

(72) Inventors: Oleksiy Ignatyev, Belmont, CA (US); Mihir Bharatkumar Shah, Newark, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 370 days.

(21) Appl. No.: 16/863,221

(22) Filed: Apr. 30, 2020

(65) Prior Publication Data
US 2021/0342146 A1 Nov. 4, 2021

(51) Int. Cl.
*G06F 8/77* (2018.01)
*G06F 8/71* (2018.01)
*G06F 8/60* (2018.01)
*G06N 20/00* (2019.01)

(52) U.S. Cl.
CPC ............... *G06F 8/77* (2013.01); *G06F 8/60* (2013.01); *G06F 8/71* (2013.01); *G06N 20/00* (2019.01)

(58) Field of Classification Search
CPC .... G06F 8/77; G06F 8/71; G06F 8/60; G06N 20/00
See application file for complete search history.

(56) References Cited

U.S. PATENT DOCUMENTS

| | | | |
|---|---|---|---|
| 10,956,833 B1* | 3/2021 | Yamane | G06F 11/3612 |
| 11,144,308 B2* | 10/2021 | Velayudham | G06F 11/008 |
| 11,176,015 B2* | 11/2021 | Rallapalli | G06F 11/3068 |
| 11,475,326 B2* | 10/2022 | Cmielowski | G06N 20/00 |
| 2014/0324891 A1* | 10/2014 | Kim | G06F 11/076 707/754 |
| 2016/0034270 A1* | 2/2016 | Swierc | G06F 11/3668 717/126 |
| 2017/0293542 A1* | 10/2017 | Xu | G06N 3/044 |
| 2019/0266070 A1* | 8/2019 | Bhandarkar | G06F 11/3072 |
| 2019/0287029 A1* | 9/2019 | Sobran | G06F 11/362 |
| 2019/0347188 A1* | 11/2019 | Sobran | G06N 20/00 |
| 2020/0241861 A1* | 7/2020 | Zhang | G06F 8/70 |
| 2021/0055995 A1* | 2/2021 | Biernacki | G06K 9/6272 |
| 2021/0173642 A1* | 6/2021 | Velayudham | G06F 8/71 |
| 2021/0216406 A1* | 7/2021 | Silverstein | G06F 11/3055 |

(Continued)

*Primary Examiner* — Douglas M Slachta
(74) *Attorney, Agent, or Firm* — Kilpatrick Townsend & Stockton LLP

(57) ABSTRACT

A defect level for a software application may be predicted by training a model using aspects of development processes from previous software applications as training data. Aspects of previous software development processes may be aggregated to form signal vectors for each deployed application. Defect scores calculated from actual defects in the deployed software applications may be paired with the corresponding development signal vectors. The signal vectors and calculated defect scores may act as training data and labels for a predictive model that uses lasso regression to generate a predicted defect score during the development process. A signal vector for a current development process may be updated in real time as the software is developed to update a predicted defect score and provide a subset of aspects in the signal vector that contribute most to the score such that actions may be taken to improve the score.

17 Claims, 16 Drawing Sheets

(56) References Cited

U.S. PATENT DOCUMENTS

| | | | |
|---|---|---|---|
| 2021/0255914 A1* | 8/2021 | Ciabarra, Jr. | G06F 16/245 |
| 2021/0263841 A1* | 8/2021 | Mo | G06F 11/366 |
| 2021/0318379 A1* | 10/2021 | Millican | G06N 3/045 |

* cited by examiner

SOFTWARE DEFECT PREDICTION MODEL

BACKGROUND

A software defect is an error or fault in a computer program or system that causes the program or system to behave in unintended ways or to produce an incorrect or unexpected result. Generally, most defects arise from errors made in the program design or in the program source code as the program design is implemented. Defects may also arise through interactions with other software systems, such as operating systems or network-connected services. Although pre-released testing may identify some of these defects, most defects are not discovered until after software deployment. Once the software is deployed into various deployment environments, defects may be reported by customers and/or self-reported by the software itself. Indications of these defects may then be used to provide fixes for the underlying source code. Once the cause of the defect has been identified and the source code has been repaired, new versions of the program may be compiled and distributed to the deployment environments in the form of an upgrade or a patch.

Because of the inconvenience and difficulty associated with discovering and patching software defects later in the software lifecycle, it is much more efficient to identify potential defects while software is being developed and tested before it is deployed rather than after. However, modern software systems are not only growing in size and complexity, they are also becoming much more interconnected with other software systems in a common operating environment. For example, software suites deployed to on-premise data centers and cloud computing environments may include hundreds of individual applications that interact with each other in both functionality and common data storage/access. Because software suites often deploy these packaged applications together, detecting potential software defects in any of the included applications prior to deployment is becoming increasingly important for maintaining the overall health of the code of the software suite in total. There is currently no reliable way to predict the state of health of a code base for individual software applications and/or software suites prior to deployment.

BRIEF SUMMARY

In order to accurate asses the state of health of the code for a software application prior to release, a predictive model may be trained that receives aspects of a current development cycle and outputs a predicted defect score to be expected after the software application is deployed. The predictive model may be trained using previous releases/versions of the software application, or using releases/versions of software applications with similar development processes. Aspects from these previous development processes may be used as training data sets, and the actual defect scores from the deployed software may be used as labels for the training data to train the predictive model.

During a development process for a software application, different aspects of the development process may be automatically recorded and stored during development. These aspects of the development process may include development characteristics, such as a number of lines of code revised/added, a number of other applications affected, a number of days in development, a number of software engineers assigned to the project, and so forth. Both quantitative and qualitative aspects may be converted into numerical values and stored as predictive signals in a signal vector for that software application. These predictive signals may be used to characterize any aspect of the development process. Signal vectors may be stored in a library for previous development processes for the application or similar applications, and a real-time signal vector may be maintained for a current development process for an upgrade or new version of the application.

After deployment, the previous versions of the application likely experienced a number of defects. These defects may be reported by customers through an incident management system or may be automatically self-reported by the software itself. These defect indicators may be received by the system and used calculate a defect score. The defect score may be calculated using defect characteristics, such as a severity of the defect, a number of customers affected by the defect, a number of times the defect was reported, and so forth. Weighting factors may be applied to each defect, and a weighted combination of defects may be calculated to determine the defect score. Defect scores for previous development processes for the application may be stored with their corresponding signal vectors.

To generate a predicted defect score for a current software development process, the predictive model may be trained by providing the signal vectors from previous development cycles to the predictive model as training data sets. The corresponding defect scores for the previous development processes may be used as labels for the training data sets to train the model. Some embodiments may use a linear regression technique to train the model. For example, lasso regression may be used to output a linear combination of a subset of the inputs from the signal vector. This linear combination may be used to calculate the predicted defect score. Lasso regression and other similar techniques may generate zero-value coefficients for some of the input values, thereby identifying the input values that contribute most to the predicted defect score by assigning these input values nonzero-value coefficients.

The signal vector for a current development process may be updated automatically in real time by the development environment. The real-time signal vector may also be provided to the predictive model in real-time to generate a real-time predicted defect score. In addition to providing the raw defect score, the input variables with non-zero coefficients in the predictive model may also be provided. This provides an actionable list of aspects of the software development process that may be addressed during development in order to improve the predicted defect score prior to release. Current values for these actionable inputs may be provided alongside target values that are calculated to reduce the defect score below an acceptable threshold level.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for training and using a model for predicting a deployment defect score for a software application during development. A defect level for a software application may be predicted by training a model using aspects of development processes from previous software applications as training data. Aspects of previous software development processes may be aggregated to form signal vectors for each deployed application. Defect scores calculated from actual defects in the deployed software applications may be paired with the corresponding development signal vectors. The paired signal vectors and calculated defect scores may act as training data and labels for a predictive model that uses lasso regression to generate a predicted defect score during the development process. A signal vector for a current development process may be updated in real time as the software is developed to update a predicted defect score and provide a subset of aspects in the signal vector that contribute most to the score such that corrective actions may be taken to improve the score.

Figure 1:
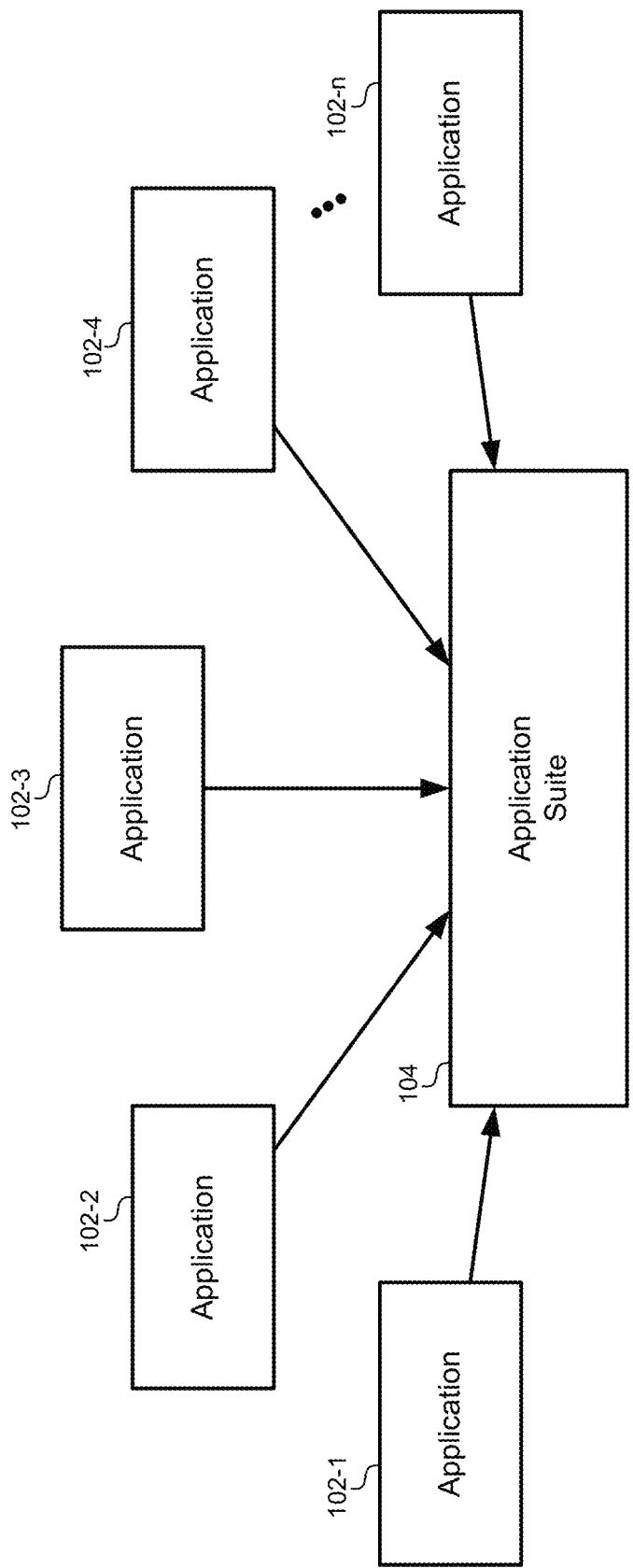
FIG. 1 illustrates an application suite comprising a plurality of applications, according to some embodiments.

FIG. 1 illustrates an application suite 104 comprising a plurality of applications 102, according to some embodiments. The application suite 104 may represent an overarching software environment that aggregates and integrates a number of applications 102 together in order to provide an integrated package of services that are related. Each of the applications 102 may be developed, deployed, and/or updated separately and independently from other applications in the application suite 104. Therefore, each of the applications 102 may have their own defined software lifecycle that includes maintenance and upgrades after initial deployment. Additionally, the application suite 104 may be evaluated according to its own aggregation code, as well as the combined performance of each of the applications 102.

The application suite may include a predefined release process where upgraded versions of the application suite 104 are deployed. Each release of the application suite 104 may include upgrades and/or new versions of any of the applications 102. Additionally, each of the applications 102 may be patched and/or upgraded independently without necessarily requiring a new version of the entire application suite 104 to be deployed.

When upgrading and/or providing new versions of any of the applications 102 or the application suite 104, development personnel may attempt to evaluate the health of the code before it is released into the deployment environments. However, because of the distributed nature of the applications 102 in the application suite 104, each of the applications 102 may follow their own evaluation criteria and testing protocol. The methods for determining the health of an upgrade or alteration to each of the applications 102 may be made at the application-level, and thus each of the applications 102 may be evaluated differently according to procedures established by their independent development teams. Furthermore, the evaluation of the application suite 104 prior to deployment may include both an independent evaluation of any suite-level integration code as well as an aggregation of the distributed evaluations of each of the applications 102.

The software evaluation process described above includes a number of different technical problems that affect the quality of the released software. Due to individual team characteristics and the complexities of the overall processes involved with evaluating software releases, many application suites 104 may be released with different criteria being applied to each of the applications 102. Additionally, because the evaluation processes for each of the applications 102 may vary in rigor and effectiveness, there is no systematic way to identify whether the overall state of the application suite 104 is healthy prior to release. For example, many current practices allow individual test engineers and/or managers representing their teams to determine when the applications 102 are individually ready to release. This may often include semi-manual methodologies that miss vulnerabilities, and the evaluation criteria is often not centralized for the overall release of the application suite 104. In some cases, individual managers may create dashboards or different metrics that catalog concerns that may arise during the development process. However, these individual techniques miss the overall effect that aggregated defects in each of the applications 102 may have on the overall health of the application suite 104. For example, a large application suite 104 may include more than 100 scrum teams and dozens of managers and individuals who follow their own practices and use different data sets for evaluating the health of a code base prior to release.

The embodiments described herein solve these and other technical problems by automatically gathering aspects of the development process for each of the applications 102. These aspects may include numerical evaluations (e.g., number of lines of code edited) and/or characterizations of the development process (e.g., was a design review completed?). These aspects may be translated into numerical representations that represent predictive characteristics or signals derived from the development process. After release, defect indications may be received from the deployment environments. For example, customers may report software failures that are automatically imported through an incident management system. The software itself may also self-report when crashes or failures occur. These defect indications may be aggregated and combined in a weighted combination to generate a defect score for the release. The post-release defect score and the pre-release signal vector of predictive signals may be used to train a model. During future development cycles, the predictive signals may be collected automatically from a current development process and provided as an input to the trained model. The trained model may then generate a predicted defect score. The predicted defect score may be used to characterize the state of health of the code prior to the software release rather than waiting for defects to occur after the software release. In some embodiments, the model may generate the predicted defect score using a weighted combination of predominant factors in the signal vector that contribute to the score. These factors may be made available to the development team such that specific actions may be generated to change the predicted defect score to be more satisfactory prior to release.

This process standardizes assessing the quality of the code for applications 102 across an application suite 104. This process also predicts defect levels that may arise prior to release rather than waiting until after deployment to evaluate the software. This allows software teams to implement specific actions that are targeted to reducing the predicted defect score preemptively rather than waiting until after release to apply patches and identify problems in the software. As the model is trained, specific areas of importance can be highlighted in the development process such that these areas can receive more attention while the code is developed.

Although an application suite 104 comprising a plurality of applications 102 is illustrated in FIG. 1, this is provided only by way of example and is not meant to be limiting. The techniques and systems for evaluating software code may be used for large projects such as the aggregated application suite 104, as well as individual applications 102 in isolation. For example, application 102-1 may be evaluated using these techniques/systems without regard to evaluations that may occur for other applications 102 and/or the application suite 104 as a whole. Alternatively, the application suite 104 may be evaluated using these techniques/systems by combining the aspects of the development process and predictive signals from each of the applications 102. This may be used to generate a predicted defect score for the application suite 104 as a whole.

Figure 2:
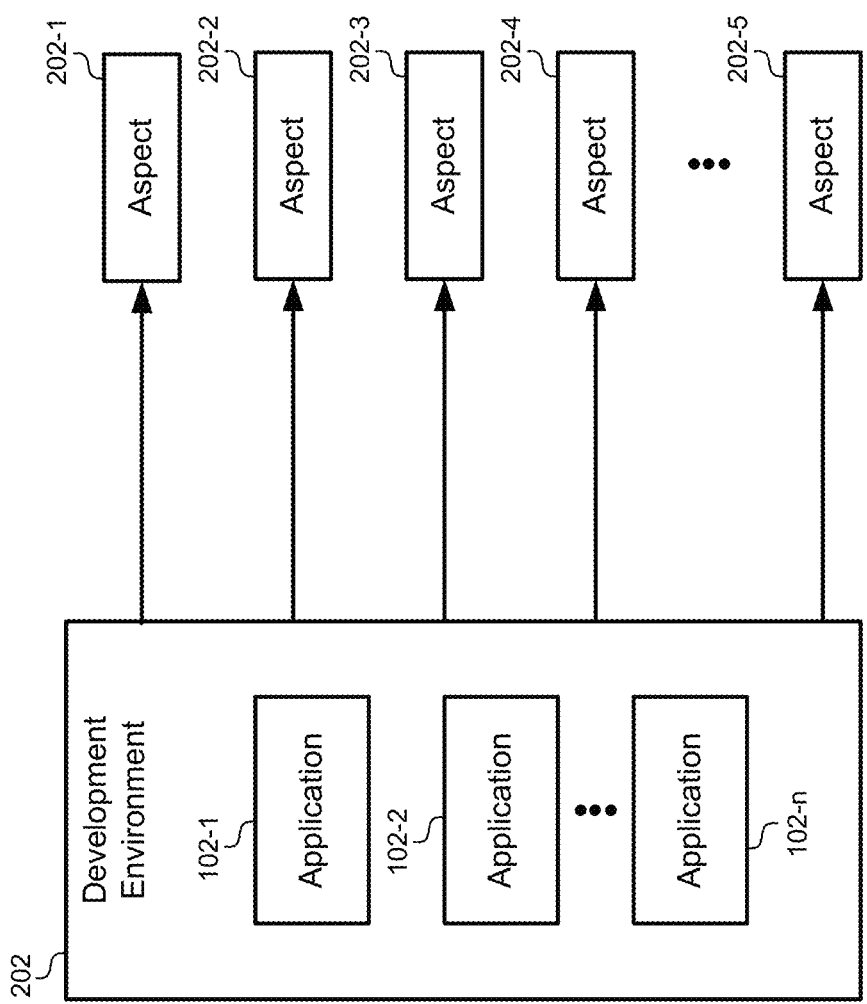
FIG. 2 illustrates a development environment for one or more applications, according to some embodiments.

FIG. 2 illustrates a development environment for one or more applications, according to some embodiments. The development environment may include Integrated Development Environments (IDEs) or other development tools that integrate code libraries, programming tools, and/or other software development tools. Each of the applications 102 may use a common development environment and/or may use independent and separate development environments. The development environment 102 may be used to develop the applications 102 prior to release and to maintain, patch, upgrade, and develop new versions for the application after deployment.

The development environment 202 may automatically generate aspects 202 of the development process for any and/or all of the applications 102. Aspects 202 of the development process may include quantitative numerical values as well as qualitative characterizations of the development process. For example, the aspects 202 may include a number of days spent in the development process. The development environment 202 may calculate this automatically from the time that a new project is opened or an existing project is reopened until a current date. The aspects 202 may also include other quantitative numerical values, such as a number of failed internal tests, a test failure rate, a number of lines of code edited and/or added, a number of modules affected, a percentage of code reused, and/or any other values that may be automatically extracted from the development environment 202.

In addition to receiving values directly from the IDEs in the development environment 202, some embodiments may also receive values from other development tools in the development environment 202. For example, project planning software may provide qualitative characterizations such as a number of design reviews that were completed, a number of iterations in the design process, a number of programmers assigned to the project, and/or other information that may characterize the development process. Note that the aspects 202 may include any type of information that may be derived from the development process. Even information that does immediately appear to relate to software quality may be used to later train the model, and may reveal a correlation between these aspects and the predicted defect score.

The development environment 202 may provide the aspects 202 automatically to a defect prediction process. For example, the development environment 202 may include a web interface, an API, a service, a micro service, or other interface through which the aspects 202 may be retrieved as they are aggregated and collected by the development environment 202 during the development process. In some embodiments, the development environment 202 may package the aspects into one or more data structures that are then sent to, or made available to the defect prediction process. For example, the development environment 202 may package the aspects 202 in an XML file, a JSON file, a database, and/or any other data structure that may be sent to the defect prediction process periodically during the development process.

Figure 3:
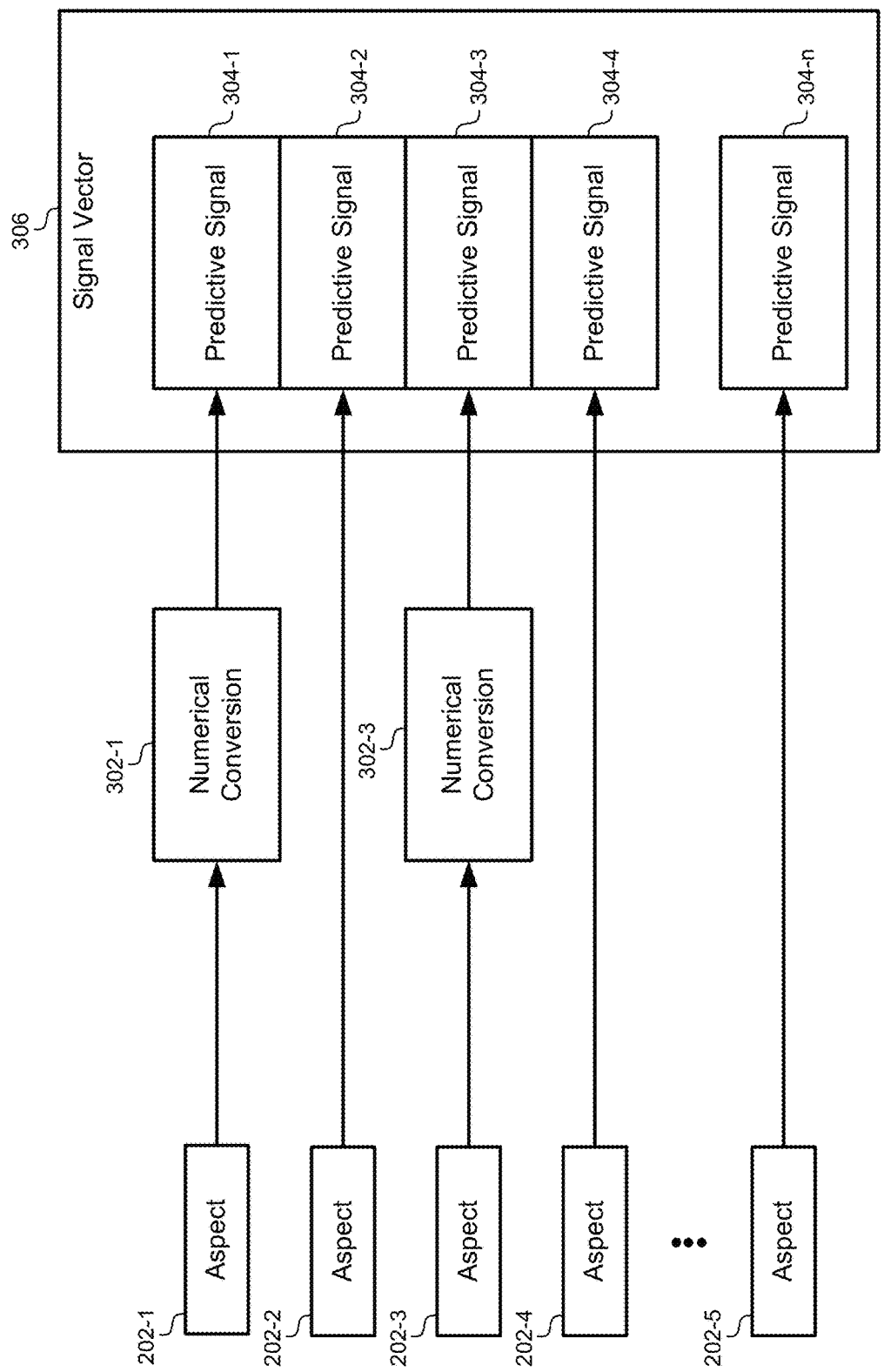
FIG. 3 illustrates how aspects of the development process may be translated into predictive signals in a signal vector, according to some embodiments.

FIG. 3 illustrates how aspects of the development process may be translated into predictive signals in a signal vector, according to some embodiments. The translation process may be different for each type of aspect. For example, qualitative aspects that characterize the development process may be processed using a numerical conversions 302 to turn the qualitative assessments into numerical representations. For example, an aspect 202-1 may indicate whether a certain number of design reviews were held. The numerical conversion 302-1 may translate this into a binary digit representing a Boolean value for the aspects 202-1. In another example, an aspect 202-3 may represent a level of severity associated with the upgraded code, such as high, medium, and/or low. The numerical conversion 302-3 may translate this aspect 202-3 into one or more numerical values representing these different levels.

Qualitative numerical aspects may be directly used in the signal vector 306. Some embodiments may scale the numerical aspects such that at least some of the numerical aspects are comparable on a common scale. For example, aspects 202-2 may be scaled such that the minimum/maximum values fall between 0.0 and 1.0. Alternatively, aspect 202-4 may be scaled such that the minimum/maximum values fall between 0 and 100.

After being translated into numerical representations, each of these aspects may represent a predictive signal 304. The predictive signals 304 may be aggregated together into a signal vector 302 for the development process. Generally, a signal may refer to any output from the development process. This disclosure may refer to these signals as predictive signals 304, as they are used to train a predictive model that predicts a defect score based on the received predictive signals. The predictive signals 304 may also be used as an input to a trained model to predict a defect score for a current software development process. The signal vector 306 may be implemented using an array or vector of numerical values and may characterize the state of the development process. Therefore, each development process may correspond to a signal vector 306 that stores the numerical representations of the aspects of that development process.

Figure 4:
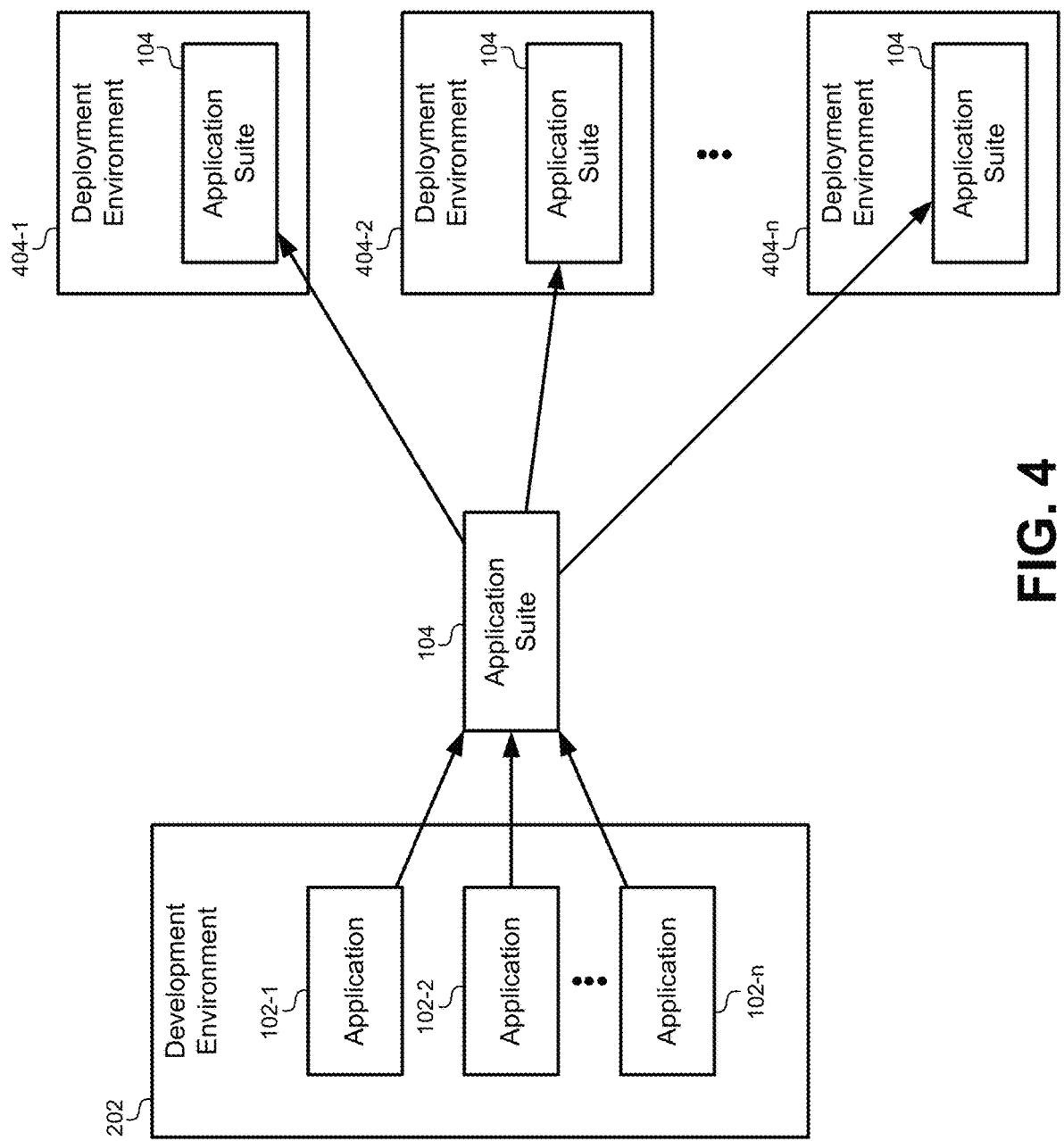
FIG. 4 illustrates how the application suite may be distributed to various deployment environments, according to some embodiments.

FIG. 4 illustrates how the application suite 104 may be distributed to various deployment environments, according to some embodiments. After each of the applications 102 are developed and/or upgraded in the development environment 202, the may be packaged into the application suite 104 and deployed to one or more deployment environments 404. Copies of the application suite 104 may operate in each of the deployment environments 404. The deployment environments 404 may be separate and distinct from the development environment 202. For example, the deployment environments 404 may represent on-premise customer systems where the application suite 104 is installed and operates. In some embodiments, the deployment environments 404 may represent cloud-based infrastructures that host customer applications and/or data.

As described above, the deployment process illustrated in FIG. 4 may apply to aggregated application suites 104 that include multiple applications 102. The deployment process may also apply to individual applications singly that may or may not be part of a larger application suite 104. In some embodiments, the deployment of the application may take place after the signal vector 306 for the development process of the application suite 104 has been received.

Figure 5:
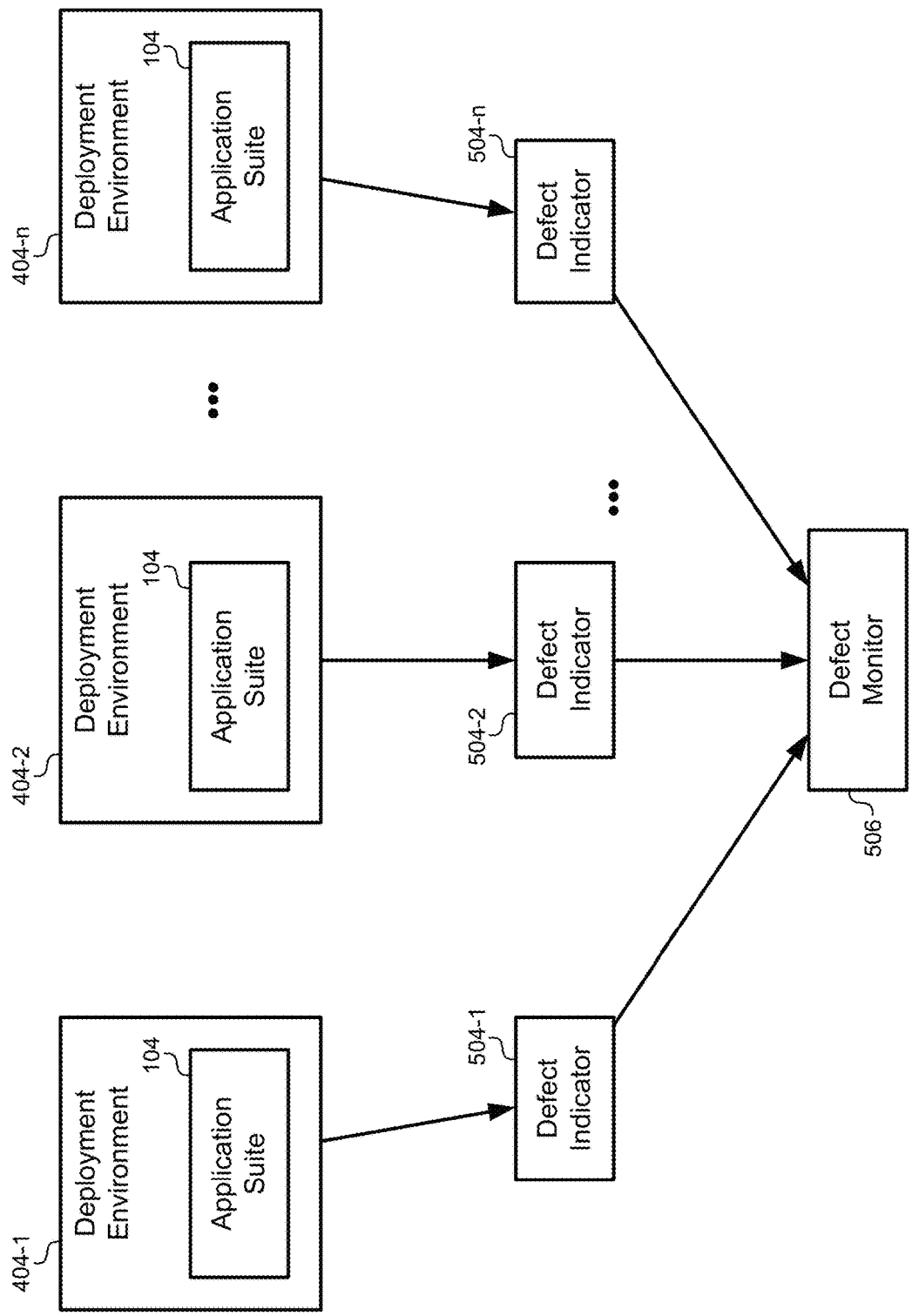
FIG. 5 illustrates how defect indications may be received from the development environments after deployment, according to some embodiments.

FIG. 5 illustrates how defect indications may be received from the development environments after deployment, according to some embodiments. While the application suite 104 and/or any individual applications 102 are operating in the development environments 404, defects may occur. A defect may be classified as any unexpected or abnormal operation of the application and/or application suite 104. For example, a defect may include a crash where the software application terminates operation unexpectedly or prematurely. The defect may include bugs where the application processes or stores data incorrectly. The defect may also include any error, flaw, or fault that causes the software application to produce an incorrect or unexpected result or to behave in unintended ways.

In some embodiments, the deployment environments 404 may automatically report the occurrence of defects to a defect monitor 506. The defect monitor may include a server or other system provided by the software developer that monitors and records defect indications as they are received. For example, the application suite 104 may automatically report a defect indication 504 to the defect monitor 506 when the defect occurs. A software crash may cause the application to automatically report various run-time variables or states to the defect monitor 506 when or after the defect occurs. In some embodiments, a customer may open a support ticket or other incident record describing the defect. This incident record may be entered into an automated incident management system that may communicate with, or be part of the defect monitor 506. These various systems may allow the deployment environments 404 to automatically provide defect indications 504 to a defect monitor 506. The defect monitor 506 may then aggregate and collect these defect indications for each application suite and/or application being monitored.

Figure 6:
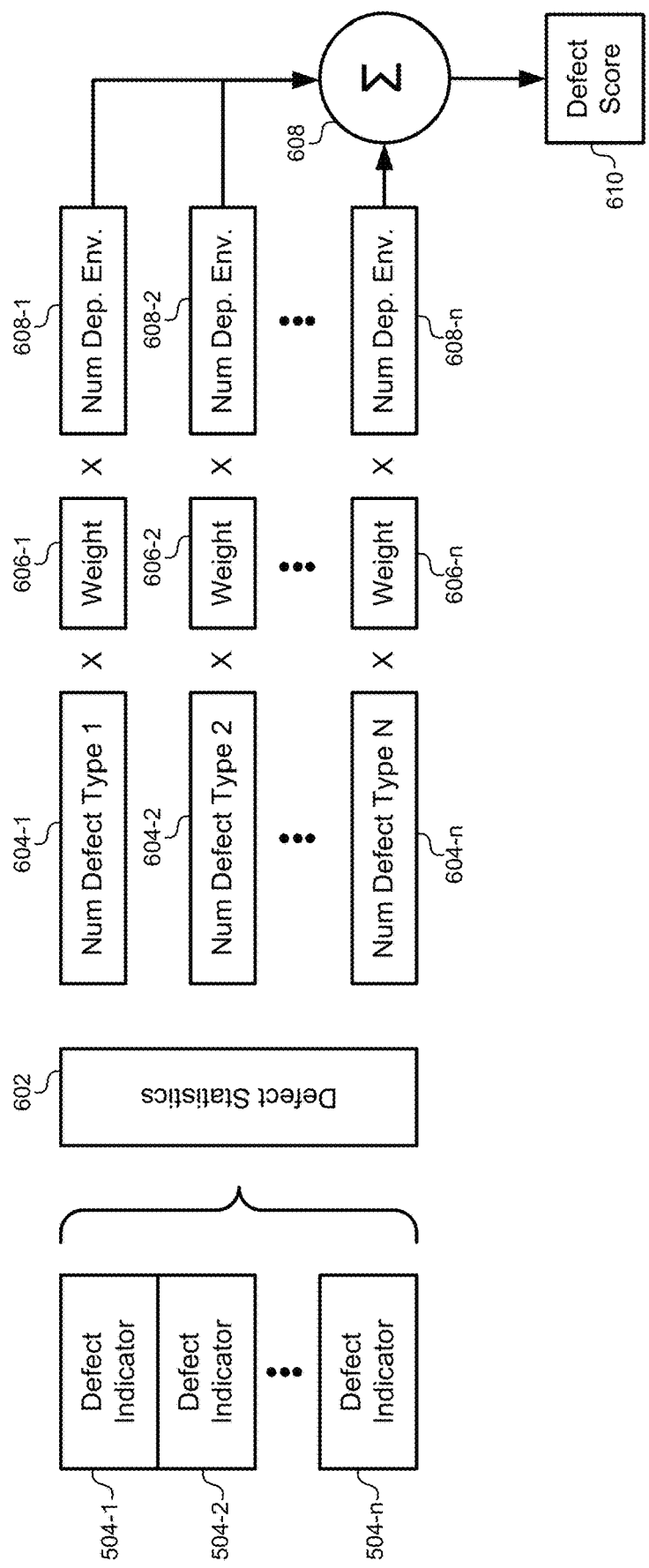
FIG. 6 illustrates how a collection of defect indications may be used to generate a defect score for a deployed software application, according to some embodiments.

FIG. 6 illustrates how a collection of defect indications may be used to generate a defect score for a deployed software application, according to some embodiments. As described above, the defect indicators 504 may be collected by a defect monitor 506. The defect monitor 506 may include a statistical analysis 602 that combines, aggregates, and/or characterizes the defect indicators 504. For example, some embodiments may collect all of the defect indicators related to a specific defect type, such as a failure to establish a communication channel, a memory overrun, a divide by zero error, and/or other defect types. This may be used to generate a number of defects for each specific type 604. In some embodiments, the statistical analysis 602 may also calculate a number of development environments 608 associated with each defect type 604. This allows the defect monitor to identify defects that are widespread across a customer base as opposed to defects that are concentrated with a small subset of customer deployment environments.

These and other statistical characterizations of the defect indicators received by the defect monitor they be used to generate a defect score 610. Many different mathematical combinations may be used to analyze and combine the defect indicators into a defect score 610. As one nonlimiting example, FIG. 6 illustrates how a defect score may be generated by multiplying the number of defects of each type 604 by a weight 606. This product may then be multiplied by the number of development environments 608 affected by the defect type. These products may be calculated for each defect type, and the product may be aggregated 608 together to calculate the final defect score 610. The defect score may then be scaled in some embodiments (e.g., between 0 and 100). A defect score 610 may be calculated for each deployment of the application across a number of different deployment environments.

The description above illustrates two different numerical characterizations that may be generated for each software deployment. The signal vector that characterizes the development process may be generated during or after the deployment of the application and may be specifically related to the development process itself. In contrast, the defect score may be calculated from the feedback and defect indications received from the deployment environments after the development process is complete and the application has been deployed. The embodiments described herein use these two pre-deployment and post-deployment data sets to train a model to predict the defect score for future software development processes.

Figure 7:
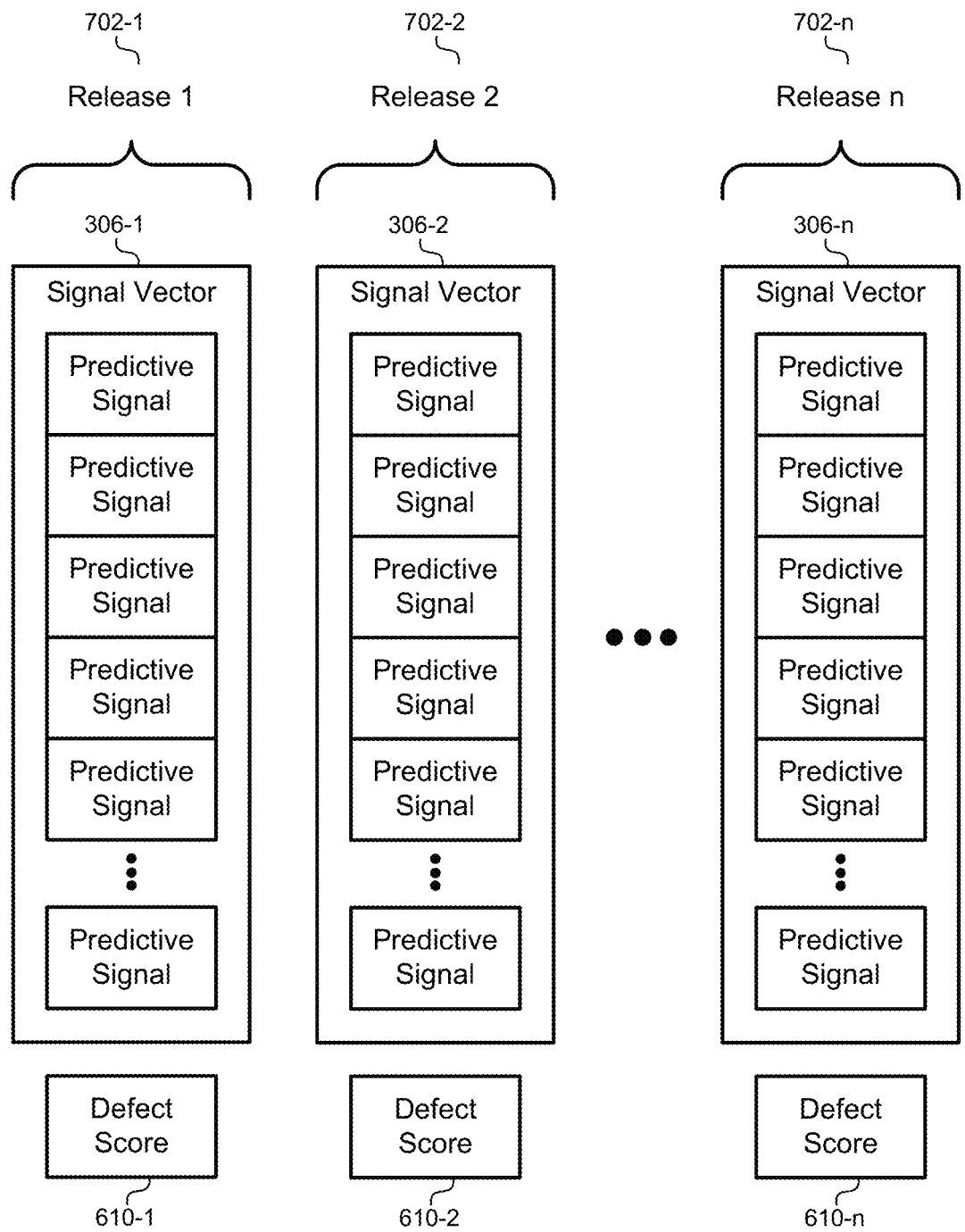
FIG. 7 illustrates a collection of signal vectors and defect scores, according to some embodiments.

FIG. 7 illustrates a collection of signal vectors 306 and defect scores 610, according to some embodiments. Each software application may be associated with a development process, and the development process may be associated with a signal vector 306 as described above. Additionally, after deployment, each software application may be associated with a defect score 610. A library of signal vectors 306 and defect scores 610 may be generated for each software application that is developed and/or released. This library of signal vectors 306 and defect scores 610 may then be used as training data sets for the predictive model.

As used herein, a "software application" may refer to a release of a software application. Therefore, a "first software application" may refer to previous release of a software application, and a "second software application" may refer to a subsequent release of the same software application. Thus, upgrades or new versions of a software application may be referred to as first/second software applications to differentiate one from the other. Alternatively, the first/second software applications may refer to different software applications that are not necessarily versions of each other. Instead, this model may also be used for different software applications that have similar development processes. For example, software applications that use similar requirements, evaluation techniques, development processes, etc., may use the same model.

As described above, signal vectors 306 and defect scores 610 may be gathered for individual applications in an application suite. Additionally, the system may store signal vectors 306 and defect scores 610 for the application suite as a whole. For example, some embodiments may aggregate the signal vectors 306 from the individual applications in the application suite to form a signal vector for the application suite as a whole. Similarly, the statistics used to generate the defect scores 610 for the individual applications may be combined to generate a defect score for the application suite as a whole. Thus, these embodiments may be used on single software applications as well as combined application suites without restriction.

Figure 8:
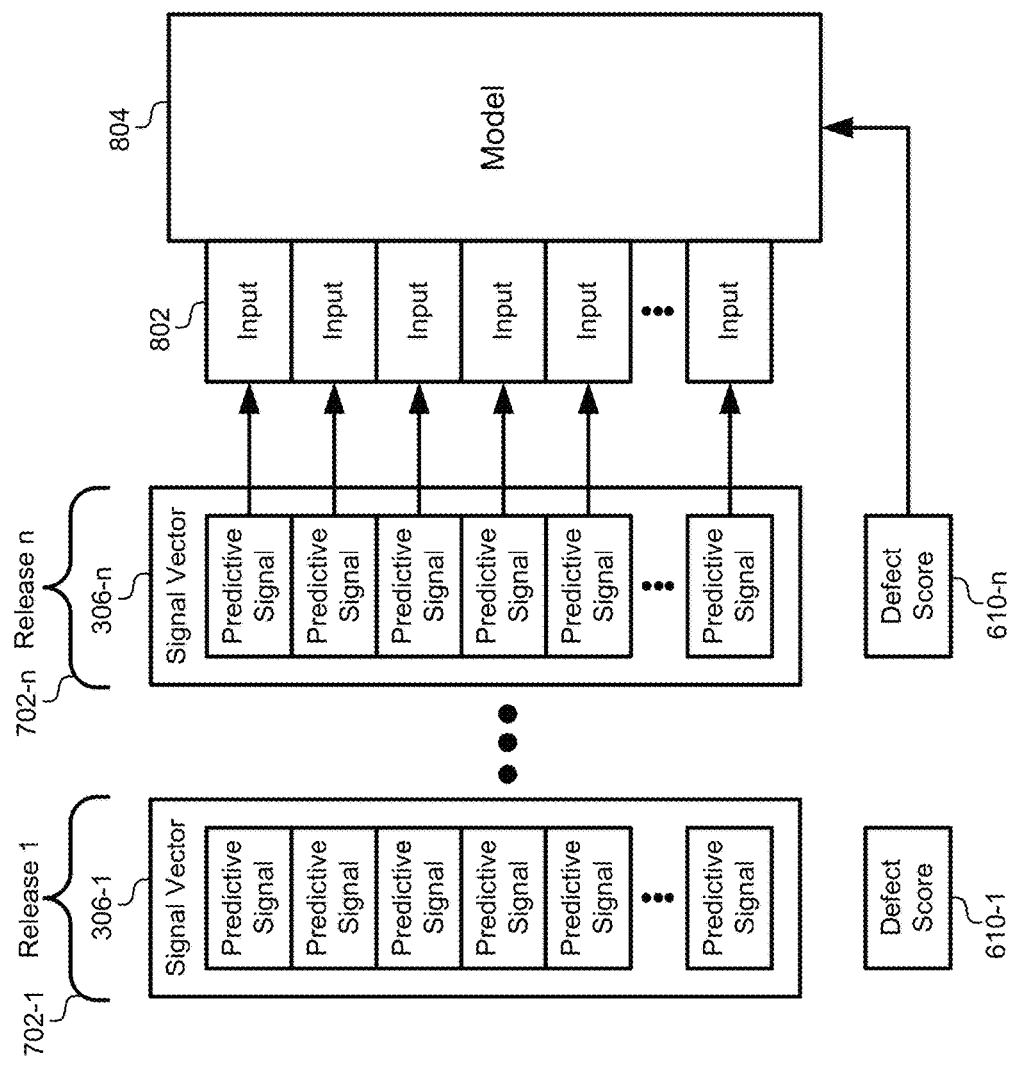
FIG. 8 illustrates how signal vectors and defect scores may be used to train a predictive model, according to some embodiments.

FIG. 8 illustrates how signal vectors and defect scores may be used to train a predictive model, according to some embodiments. The model 804 may include a number of inputs 802 corresponding to a number of predictive signals in the signal vectors 306. Each of the signal vector and defect score pairs may relate to a specific release 702 of a software application, and the model 804 may be specific to the software application. During the training process, the signal vectors 306 may act as input training data sets and the defect scores 610 may act as labels for those data sets. The training process may operate to configure the model 804 to generate the defect scores 610 from the corresponding signal vector inputs.

In some embodiment, the model 804 may be trained using a lasso regression technique or other similar technique. Lasso regression is a type of linear regression that uses shrinkage, where data values are "shrunk" towards a central point. The lasso procedure generates simple, sparse models with fewer parameters than the number of inputs provided. Lasso regression may be particularly well-suited for the model 804 because it reduces the inputs 802 to a subset of predictive signals that are predominantly correlated to the defect score output. As described in greater detail below, the output of the model 804 may include an output of the subset of predictive signals that contribute most heavily to the defect score. This allows the defect score to be actionable and provide specific areas of the development process where changes may be made to improve the predicted defect score.

In one example, when optimizing the model 804 using the library of signal vectors 306 and defect scores 610 as training data, the lasso regression may perform a L1 regularization which as a penalty equal to the absolute value of the magnitude of each coefficient in a linear combination of inputs. This regularization may generate a sparse model with fewer coefficients by minimizing some coefficients to be approximately zero and thus be eliminated from the model. Non-zero coefficients may correspond to the subset of inputs 802 that are used to calculate the predicted defect score. Various techniques may be used to perform the regression, such as a quadratic programming algorithm that minimizes a sum of squares with various constraints. Some embodiments may include a tuning parameter that controls the strength of the L1 penalty representing the "shrinkage" described above.

After training, the model 804 may be used to predict a defect score based on an input signal vector. As described above, a defect score previously had to be calculated by collecting, analyzing, and combining actual defect indications received from a deployed version of the application operating in a deployment environment. This necessarily required actual deployment of the application before a defect score could be calculated. Assessing a state-of-health of the application consequently meant detecting errors as the application was operated by customers. In contrast, the model 804 provides a way to predict a defect score prior to the application being deployed. The characteristics of the deployment process as represented by the signal vector may be provided to the model 804 to generate a predicted defect score.

Figure 9:
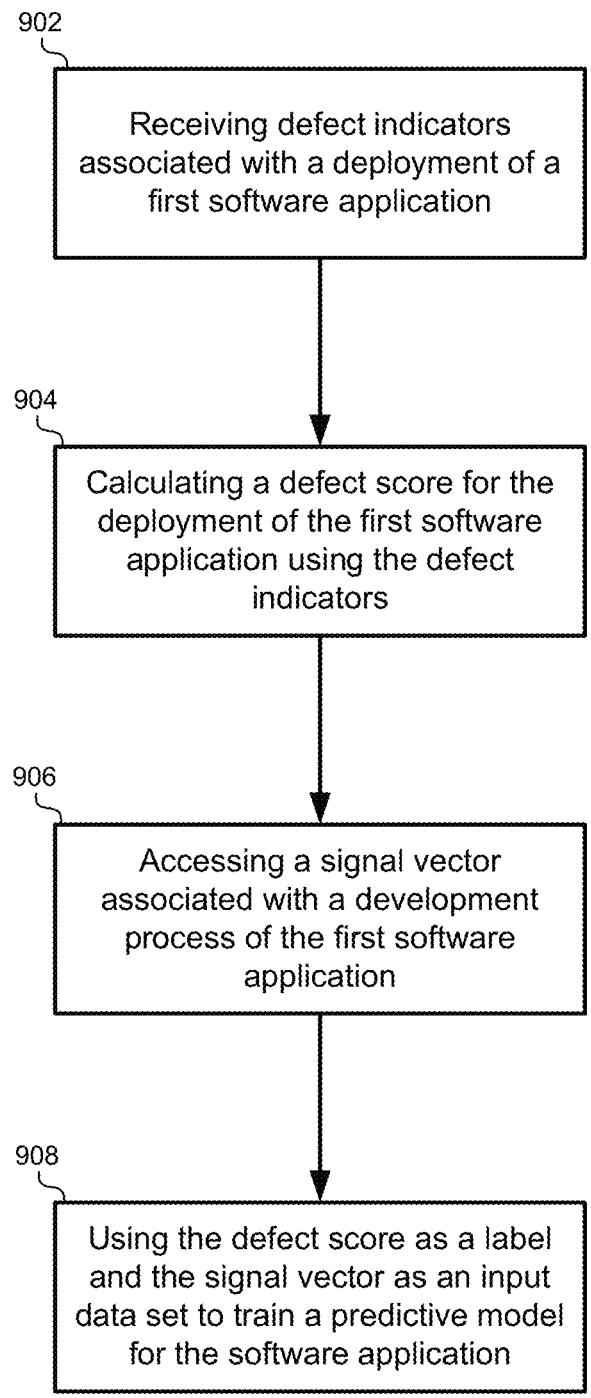
FIG. 9 illustrates a flowchart of a method for predicting a defect level in a software application, according to some embodiments.

FIG. 9 illustrates a flowchart of a method for predicting a defect level in a software application, according to some embodiments. The method may include receiving a plurality of defect indicators associated with a deployment of a first software application (902). The first software application may represent a first version of an application. The deployment of the software application may include a deployment of the software application to one or more deployment environments as illustrated above in FIG. 4. Each of the deployment environments may be configured to automatically provide defect indicators associated with the deployment as illustrated above in FIG. 5.

The method may also include calculating a defect score for the deployment of the first software application using the plurality of defect indicators (904). The defect score may be calculated using any mathematical combination of aspects of the defect indicators. One example of calculating a defect score from defect indicators is illustrated above in FIG. 6.

The method may additionally include accessing a signal vector associated with the development process of the first software application (906). The signal vector may include numerical representations of aspects of the development process. The aspects of the development process may be provided automatically from the development environment as described above in FIG. 2. These aspects may include qualitative and/or quantitative characterizations of the development process and may be converted into numerical representations that represent predictive signals in a signal vector as illustrated above in FIG. 3. Accessing the signal vector may include receiving the various aspects and/or numerical representations of the aspects and aggregating those predictive signals into a signal vector. Accessing the signal vector may also include retrieving a stored version of the signal vector.

The method may further include using the defect score as a label and the signal vector as an input data set to train a predictive model for the software application (908). The signal vector and the defect score may be one of many signal vectors and/or defect scores that are stored as part of a library associated with previous releases of the first software application. The library of signal vectors may be used to train the model to predict defect scores for future development processes. In some embodiments, the model 804 may use lasso regression as described above in relation to FIG. 8.

It should be appreciated that the specific steps illustrated in FIG. 9 provide particular methods of predicting a defect level in a software application according to various embodiments. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 10:
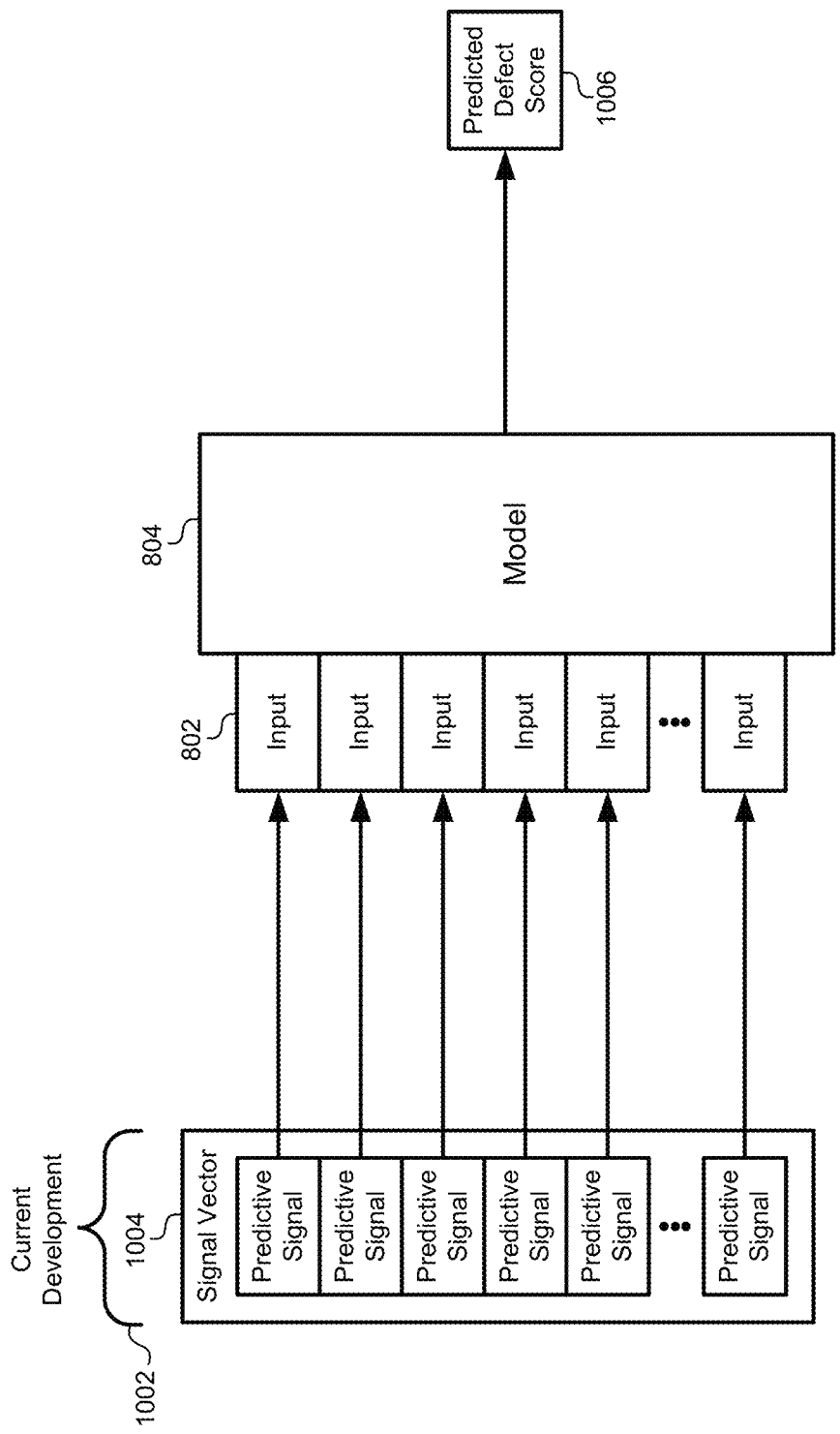
FIG. 10 illustrates how a signal vector for a current development process may be used as an input to train the model to generate a predicted defect score prior to deployment of a software application, according to some embodiments.

FIG. 10 illustrates how a signal vector for a current development process may be used as an input to train the model to generate a predicted defect score prior to deployment of a software application, according to some embodiments. As described above, the development environment may provide various aspects of the development process automatically to the system. These aspects may be provided throughout the development process such that the signal vector 1004 may populated and/or updated continuously during the development process. Therefore, the signal vector 1004 may represent a snapshot of a current stage of a current development process 1002.

At any stage during the current development process 1002, the signal vector 1004 may be provided as input to the model 804 to generate a predicted defect score 1006. Note that this provides a key technical advantage in that the defect score can be predicted for the current development 1002 prior to deployment instead of waiting to calculate the actual defect score after deployment. This allows development teams to focus on areas of the development process that are most likely to contribute to an undesirable defect score during the development process rather than responding to actual defects after the software has been deployed.

A predicted defect score 1006 may be received from the model 804 in real time as the current development 1002 is underway. In some embodiments, the predicted defect score 1006 may be generated and/or updated continuously during the current development process and made available to a software development team such that they may gauge progress towards an acceptable predicted defect score.

Figure 11:
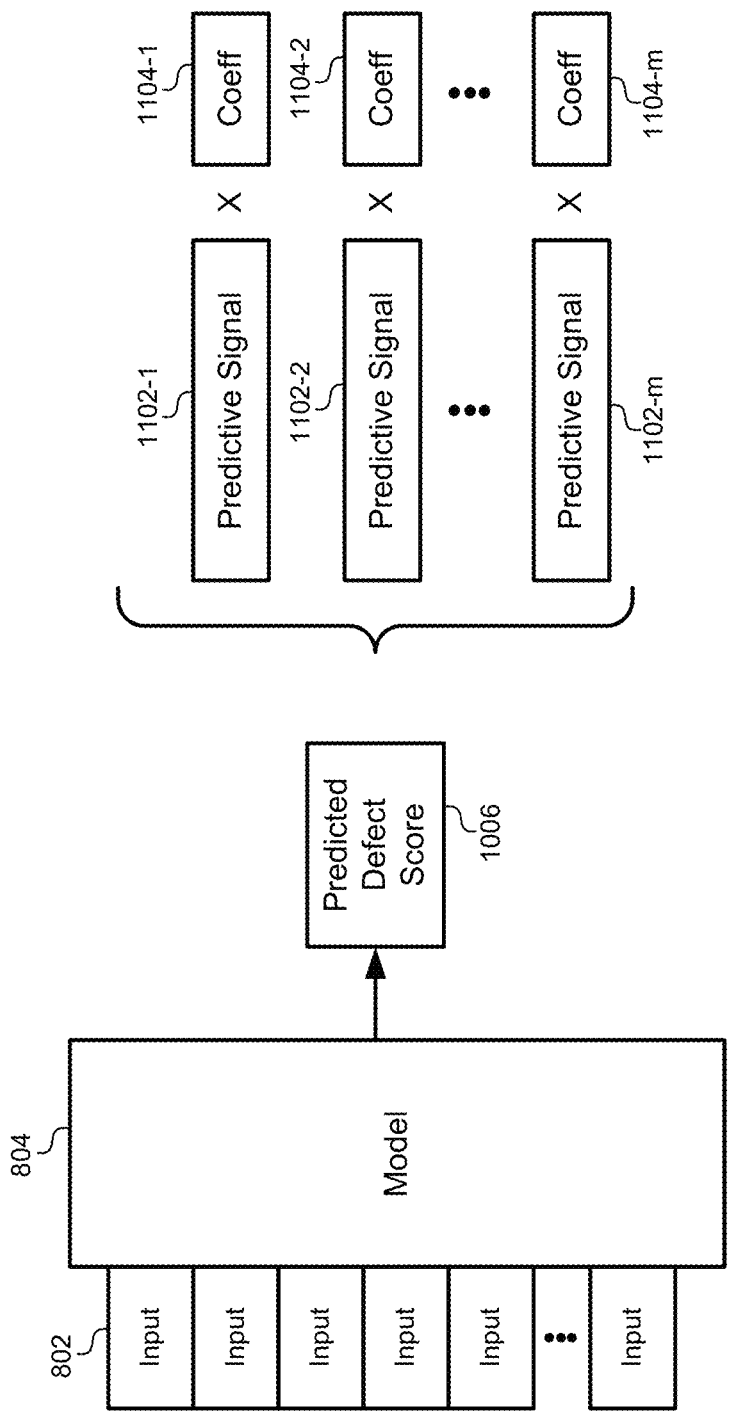
FIG. 11 illustrates how the output of the model may be used to identify specific aspects of the development process that may be adjusted to improve the predicted defect score, according to some embodiments.

FIG. 11 illustrates how the output of the model may be used to identify specific aspects of the development process that may be adjusted to improve the predicted defect score, according to some embodiments. As described above, some embodiments of the model 804 may use a regression technique, such as lasso regression, that not only generates a predicted defect score 1006, but also generates an equation representing a linear combination used to calculate the predicted defect score 1006. For example, some embodiments may provide a linear combination of a subset of predictive signals 1102 from the signal vector input. The subset of predictive signals 1102 may be associated with non-zero coefficients 1104. As described above, the lasso regression used to train the model 804 may eliminate some of the predictive signals by applying zero-value coefficients. Therefore, the subset of predictive signals 1102 may represent predictive signals from the input signal vector that contribute most to the predicted defect score 1006. The magnitude of the coefficients 1104 may indicate a relative contribution made by each of the subset of predictive signals 1102, and thus may also indicate an importance of the associated aspects of the development process.

Figure 12:
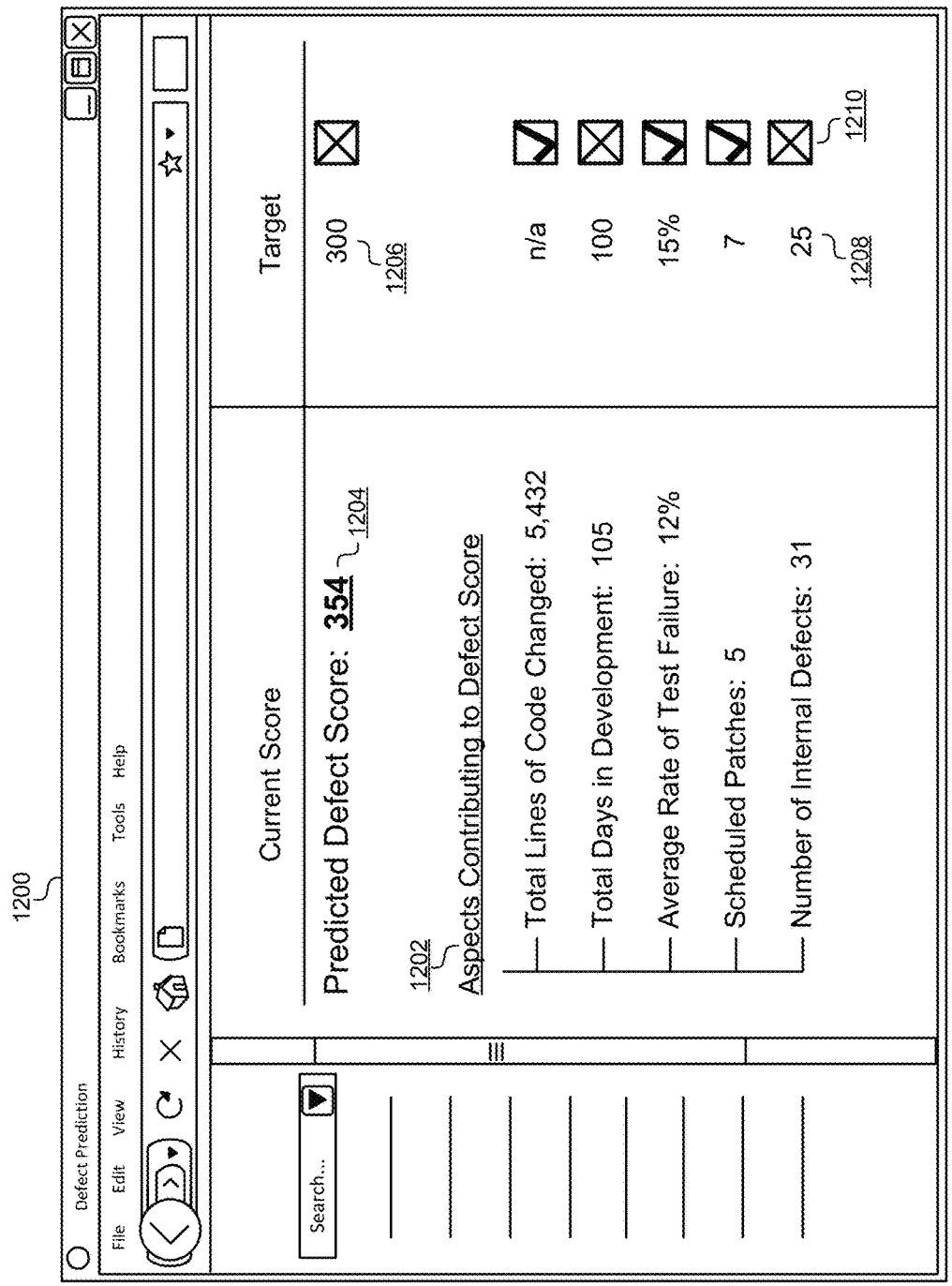
FIG. 12 illustrates an example of an interface that may be used to provide a predicted defect score with an actionable breakdown of score components, according to some embodiments.

FIG. 12 illustrates an example of an interface that may be used to provide a predicted defect score with an actionable breakdown of score components, according to some embodiments. The interface 1200 may be provided in a web browser, an application, a dashboard, a mobile app, and/or any other graphical display that may act as a front-end to the defect monitor. The interface 1200 may display the predicted defect score 1204 based on the current signal vector associated with the development process. As described above, the predicted defect score 1204 may be updated in real time as the development environment updates the signal vector input to the model. The interface 1200 may also include a target defect score 1206 that indicates an acceptable defect score for a particular software release. The development team may use the interface 1200 to monitor progress towards the target defect score 1200 as the software is developed. This allows the development team to identify early in the development process when aspects of the development process begin to negatively affect the predicted defect score. This may require significantly less programming time and effort to correct than if these aspects were highlighted later in the development process.

In addition to providing the predicted defect score 1204, embodiments of the interface 1200 may include a breakdown of aspects contributing to the defect score 1202. As described above, the trained model may provide a linear combination of a subset of the predictive signals in the input signal vector having non-zero coefficients in the output. Each of these predictive signals in the subset may be associated with an aspect of the development process. These aspects may include a textual description that may be provided in the interface 1202 providing a plain-English description of the aspect of the development process. For example, an aspect indicating a total number of days in development may be displayed in the interface 1200 such that development teams can quickly see the numerical assessments of the predominant aspects of the development process.

As with the predicted defect score 1204, some embodiments may include target values 1208 for each of the aspects contributing to the defect score 1202. The target values 1208 may be calculated automatically as values that generate the target predicted defect score 1206. Some embodiments may also include other graphical indicators 1210 that highlight specific aspects that either currently pass or fail in comparison to the target values 1208.

Figure 13:
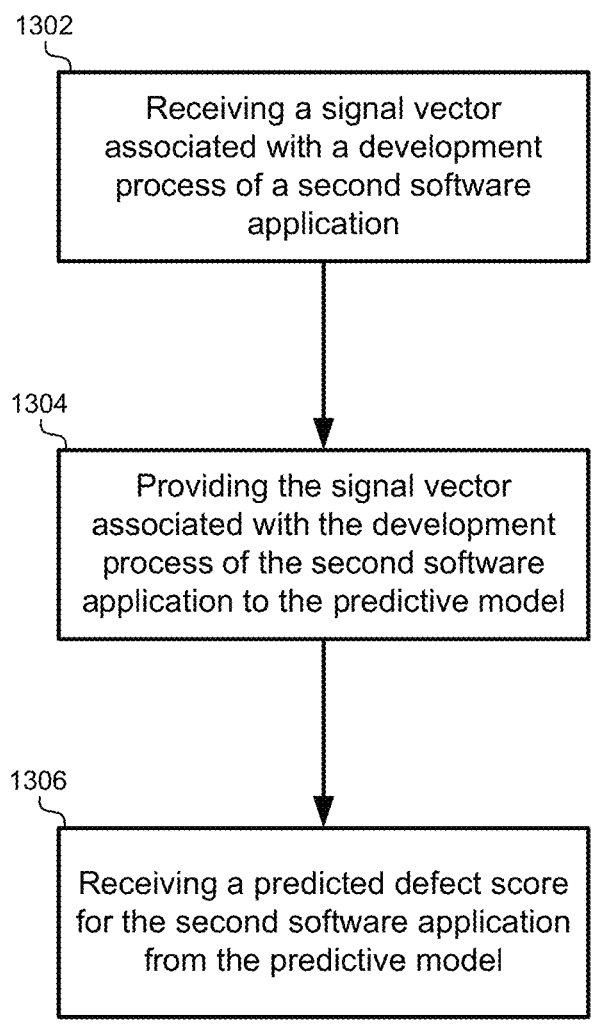
FIG. 13 illustrates a flowchart of a method for predicting a defect score for a current development process, according to some embodiments.

FIG. 13 illustrates a flowchart of a method for predicting a defect score for a current development process, according to some embodiments. The method may include receiving a signal vector associated with a development process of a second software application (1302). The "second" software application may be a subsequent version of the "first" software application described above. Alternatively, the second software application may be a different software application having a similar development process. The signal vector associated with the development process for the second software application may be received in real time as the development process is underway and may be received automatically as described above in FIGS. 2-3.

The method may also include providing the signal vector associated with the development process of the second software application to the predictive model (1304). The signal vector may be provided continuously as the development process takes place to constantly update an output indicating the predicted defect score. The input may be provided to the model as described above in FIG. 10.

The method may additionally include receiving a predicted defect score for the second software application from the predictive model (1306). The predicted defect score may include a numerical score along with a linear combination of a subset of the predictive signals in the input signal vector with non-zero coefficients in a linear combination. The linear combination may be generated as described above in FIG. 11. Additionally, some embodiments may provide an output of the subset of predictive signals and/or predicted defect score as described above in FIG. 12.

It should be appreciated that the specific steps illustrated in FIG. 13 provide particular methods of predicting a defect score for a current development process according to various embodiments. Other sequences of steps may also be performed according to alternative embodiments. For example, alternative embodiments may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
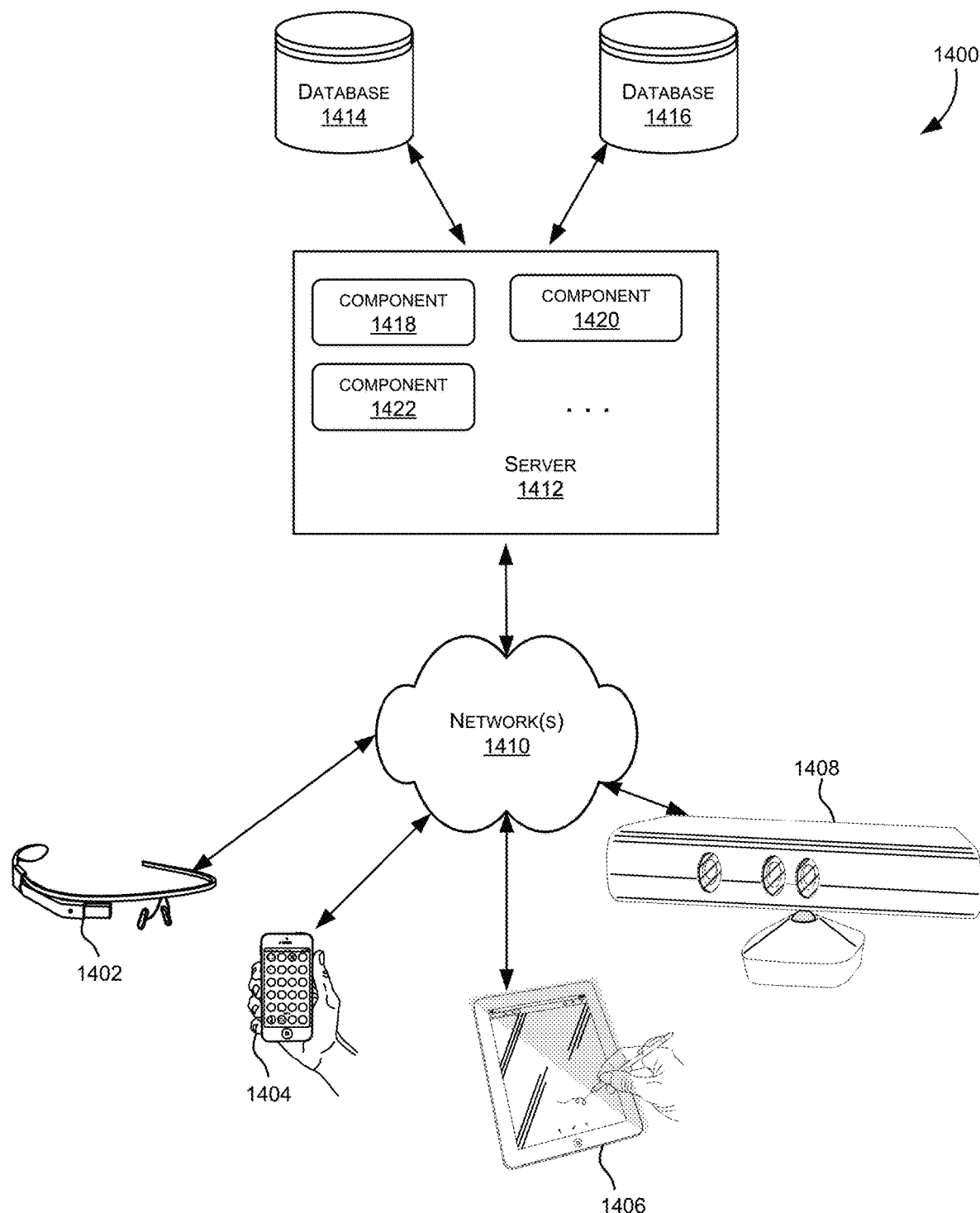
FIG. 14 illustrates a simplified block diagram of a distributed system for implementing some of the embodiments.

FIG. 14 depicts a simplified diagram of a distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
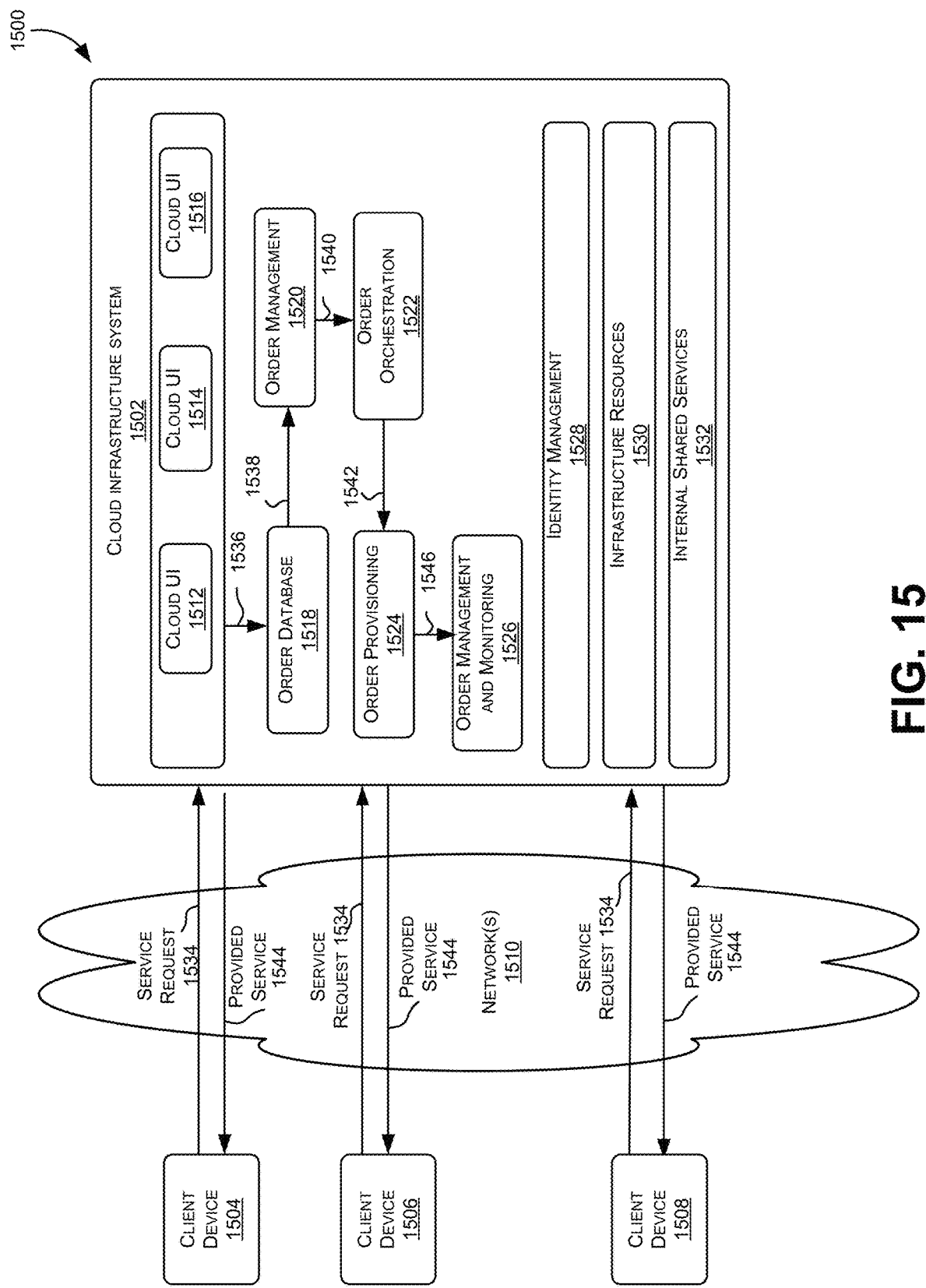
FIG. 15 illustrates a simplified block diagram of components of a system environment by which services provided by the components of an embodiment system may be offered as cloud services.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the system shown in the figure is only one example of a cloud infrastructure system that may incorporate some embodiments. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network that can support data communications using any of a variety of commercially-available protocols, including those described above for network(s) 1410.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
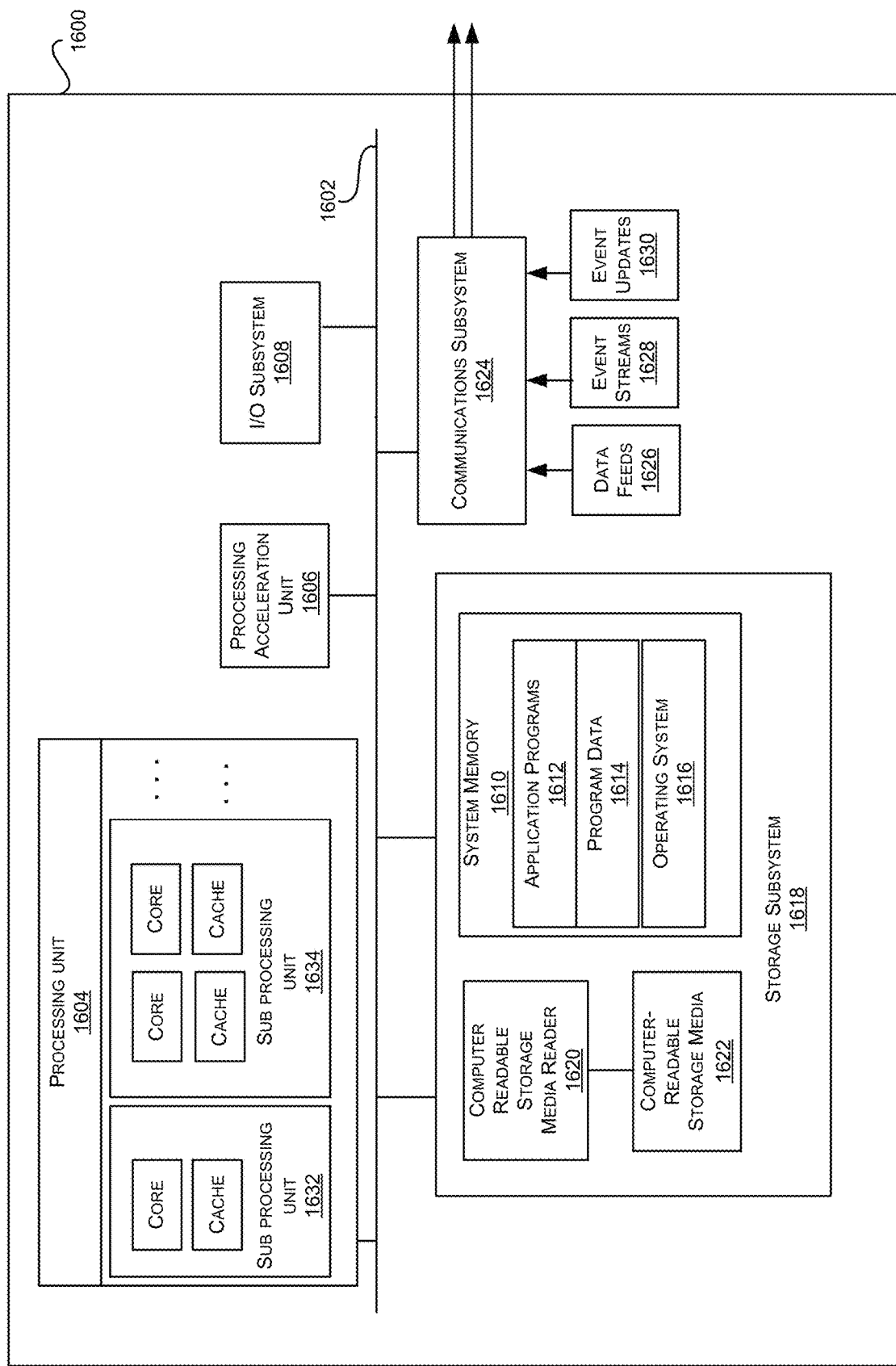
FIG. 16 illustrates an exemplary computer system, in which various embodiments may be implemented.

FIG. 16 illustrates an exemplary computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with some embodiments.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium containing instructions that, when executed by one or more processors, cause the one or more processors to perform operations comprising:
   receiving a plurality of defect indicators associated with a deployment of a first software application;
   calculating a defect score for the deployment of the first software application using the plurality of defect indicators;
   receiving a plurality of predictive signals from one or more development environments for a development process of the first software application, wherein the plurality of predictive signals comprises numerical values representing aspects of the development process of the first software application;
   combining the predictive signals into a signal vector associated with the development process of for the first software application; and
   using the defect score as a label and the signal vector as an input data set to train a predictive model for the first software application.

2. The non-transitory computer-readable medium of claim 1, wherein the operations further comprise:
   accessing a plurality of defect scores for deployments of a plurality of software applications;
   accessing a plurality of signal vectors associated with development processes of the plurality of software application; and
   using the plurality of defect scores as labels and the plurality of signal vectors as an input data sets to train the predictive model.

3. The non-transitory computer-readable medium of claim 2, wherein the plurality of software applications comprise different release versions of a same software application.

4. The non-transitory computer-readable medium of claim 1, wherein the operations further comprise:
   receiving a signal vector associated with a development process of a second software application;
   providing the signal vector associated with the development process of the second software application to the predictive model; and
   receiving a predicted defect score for the second software application from the predictive model.

5. The non-transitory computer-readable medium of claim 4, wherein the operations further comprise identifying a subset of signals in the signal vector associated with the development process of the second software application, wherein the subset of signals comprises signals that contribute to the predicted defect score.

6. The non-transitory computer-readable medium of claim 5, wherein the predicted defect score is calculated as a weighted combination of the subset of signals.

7. The non-transitory computer-readable medium of claim 5, wherein the operations further comprise identifying aspects of the development process of the second software application associated with the subset of signals.

8. The non-transitory computer-readable medium of claim 7, wherein the operations further comprise providing target values for the aspects of the development process of the second software application in comparison to current values for the aspects of the development process of the second software application from which the subset of signals are derived.

9. The non-transitory computer-readable medium of claim 8, wherein the operations further comprise generating one or more actions that are configured to cause the current values change relative to the target values such that the predicted defect score falls below a threshold defect score.

10. The non-transitory computer-readable medium of claim 1, wherein the predictive model comprises a lasso regression model.

11. The non-transitory computer-readable medium of claim 1, wherein the plurality of defect indicators are received from deployment environments after receiving the deployment of the first software application.

12. The non-transitory computer-readable medium of claim 1, wherein the plurality of defect indicators are received from deployment environments during operation of the first software application.

13. The non-transitory computer-readable medium of claim 1, wherein calculating the defect score for the deployment of the first software application comprises calculating a weighted combination of the plurality of defect indicators.

14. The non-transitory computer-readable medium of claim 13, wherein a factor in the weighted combination of the plurality of defect indicators comprises:
   a number of defects of a particular defect type;
   a weight; and
   a number of deployment environments in which the particular defect type occurred.

15. The non-transitory computer-readable medium of claim 1, wherein the plurality of predictive signals comprises:
- a number of developers contributing to the development process of the first software application;
- client applications updated during the development process of the first software application;
- a number of times a release date of the first software application was delayed during the development process of the first software application; and
- an indication as to whether a Customer Relationship Management (CRM) application was updated during the development process of the first software application.

16. A method of training models to predict defect scores for software development processes, the method comprising:
- receiving a plurality of defect indicators associated with a deployment of a first software application;
- calculating a defect score for the deployment of the first software application using the plurality of defect indicators;
- receiving a plurality of predictive signals from one or more development environments for a development process of the first software application, wherein the plurality of predictive signals comprises numerical values representing aspects of the development process of the first software application;
- combining the predictive signals into a signal vector associated with the development process of for the first software application;
- and
- using the defect score as a label and the signal vector as an input data set to train a predictive model for the first software application.

17. A system comprising:
- one or more processors; and
- one or more memory devices comprising instructions that, when executed by the one or more processors, cause the one or more processors to perform operations comprising:
  - receiving a plurality of defect indicators associated with a deployment of a first software application;
  - calculating a defect score for the deployment of the first software application using the plurality of defect indicators;
  - receiving a plurality of predictive signals from one or more development environments for a development process of the first software application, wherein the plurality of predictive signals comprises numerical values representing aspects of the development process of the first software application;
  - combining the predictive signals into a signal vector associated with the development process of for the first software application;
  - and
  - using the defect score as a label and the signal vector as an input data set to train a predictive model for the first software application.

* * * * *